United States Patent
Ichikawa

(10) Patent No.: US 8,306,413 B2
(45) Date of Patent: *Nov. 6, 2012

(54) IMAGE DISPLAY DEVICE, BRIGHTNESS CONTROL METHOD AND BRIGHTNESS CONTROL PROGRAM

(75) Inventor: Tatsuya Ichikawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/028,107

(22) Filed: Feb. 15, 2011

(65) Prior Publication Data

US 2011/0200317 A1    Aug. 18, 2011

(30) Foreign Application Priority Data

Feb. 15, 2010   (JP) .................................. 2010-030290

(51) Int. Cl.
G03B 17/20 (2006.01)
G03B 13/02 (2006.01)
(52) U.S. Cl. .................... 396/296; 396/373; 396/374
(58) Field of Classification Search .................. 396/296, 396/373, 374
See application file for complete search history.

(56) References Cited

U.S. PATENT DOCUMENTS

| | | | | |
|---|---|---|---|---|
| 4,006,485 A | * | 2/1977 | Yamanishi et al. | 396/282 |
| 4,855,770 A | * | 8/1989 | Mauchan et al. | 396/544 |
| 5,121,232 A | * | 6/1992 | Miyadera | 349/68 |
| 5,517,278 A | * | 5/1996 | Takahara et al. | 396/374 |
| 5,748,237 A | * | 5/1998 | Ueda et al. | 348/333.08 |
| 6,374,054 B1 | * | 4/2002 | Schinner | 396/282 |
| 7,167,201 B2 | * | 1/2007 | Stavely et al. | 348/333.03 |
| 2007/0019945 A1 | | 1/2007 | Kurosawa | |
| 2011/0199006 A1 | * | 8/2011 | Ichikawa | 315/158 |
| 2011/0199527 A1 | * | 8/2011 | Ichikawa | 348/333.01 |
| 2011/0200318 A1 | * | 8/2011 | Ichikawa | 396/296 |

FOREIGN PATENT DOCUMENTS

JP    2007-033701 A    2/2007

* cited by examiner

*Primary Examiner* — Rodney Fuller
(74) *Attorney, Agent, or Firm* — Kilpatrick Townsend & Stockton LLP

(57) ABSTRACT

An image display device includes a display unit that is installed inside a finder window provided in a housing and displays images, an illumination unit that illuminates a space inside the finder window, and a control unit that when brightness of the display unit is a first brightness, sets the brightness of the illumination unit to a second brightness, and when the brightness of the display unit is a third brightness brighter than the first brightness, sets the brightness of the illumination unit to a fourth brightness brighter than the second brightness.

6 Claims, 6 Drawing Sheets

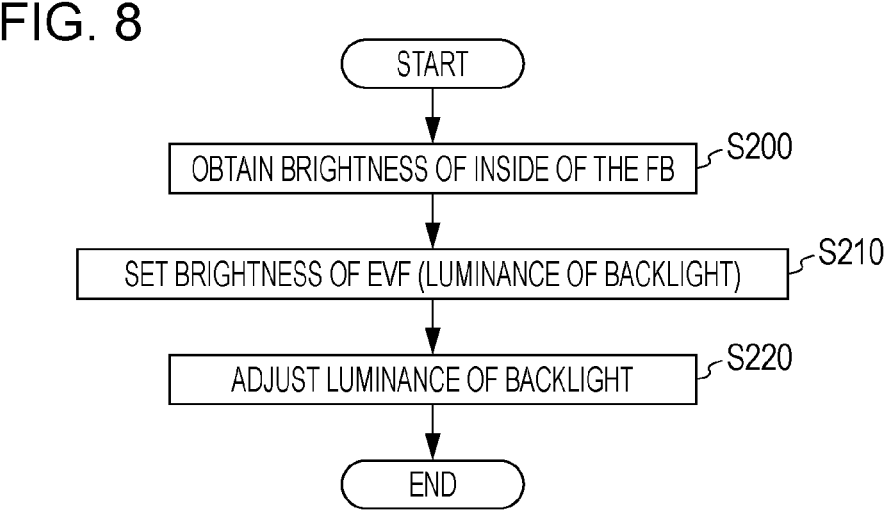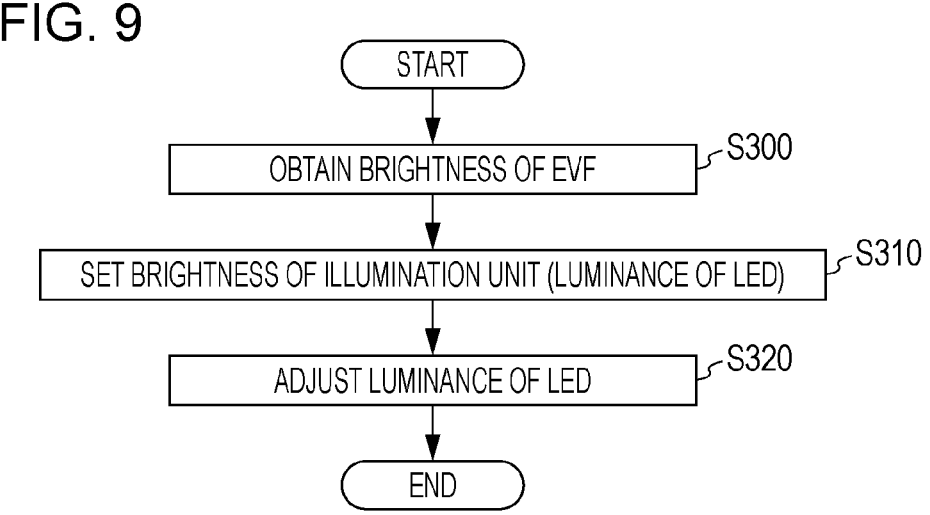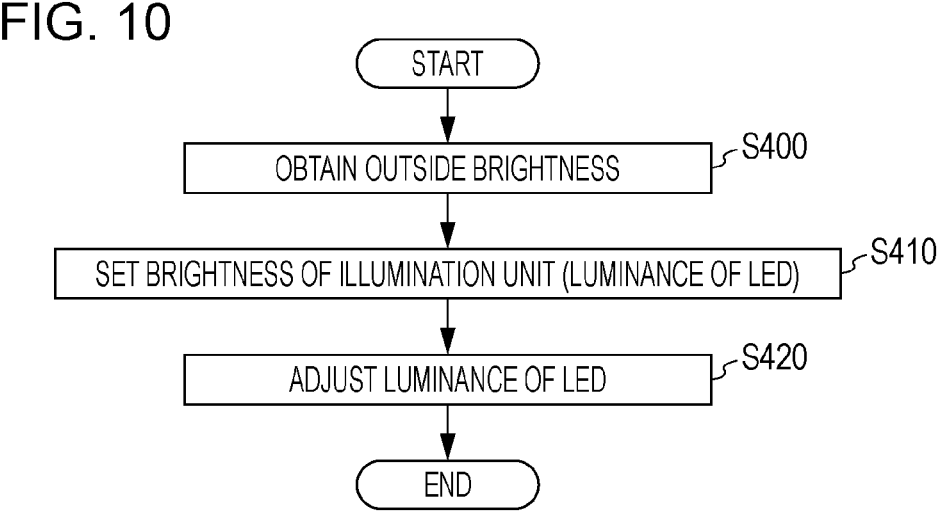

US 8,306,413 B2

IMAGE DISPLAY DEVICE, BRIGHTNESS CONTROL METHOD AND BRIGHTNESS CONTROL PROGRAM

BACKGROUND

1. Technical Field

The present invention relates to an image display device, a brightness control method, and a brightness control program.

2. Related Art

As a digital still camera (DSC), there is known one mounted with an optical finder (see JP-A-2007-33701). Also, instead of the optical finder, there is known a DSC mounted with an electronic view finder (hereinafter, referred to as an "EVF"). The EVF displays image data generated by an imaging element of the DSC on a liquid crystal screen installed in an inner space of a finder window of the finder.

In the DSC mounted with the EVF, finder image disorientation as disclosed in JP-A-2007-33701 is particularly problematic. In other words, when a user continues to view images displayed on the liquid crystal screen through the EVF, the user feels dizzy, seems to feel disorientated, or feels an unpleasant pressure behind the eye. This dizziness, disorientation or discomfort (hereinafter, collectively referred to as "disorientation") is thought to be because the user feels uncomfortable due to the EVF displaying images with a constant brightness (brightness brighter than the ambient light) regardless of the brightness of the ambient light, or because a luminosity difference between the space containing the liquid crystal screen as the EVF and the liquid crystal screen is great, or the like.

In the case of the optical finder, since the brightness of images which a user views through the finder window of the finder is not brighter than ambient light, the above-described "disorientation" is not greatly problematic. In addition, the EVF mounted in the DSC until now is relatively low in terms of the luminance of the liquid crystal screen or the resolution, and thus a user hardly feels "disorientated" as described above. However, hereafter, as a user uses the EVF more and more and luminance and definition of the EVF are increased, it is thought that the generation of the "disorientation" of a user is further problematic.

SUMMARY

An advantage of some aspects of the invention is to provide an image display device, a brightness control method, and a brightness control program, capable of reducing or eliminating disorientation of a user who views images displayed on a display unit.

According to an aspect of the invention, there is provided an image display device including a display unit that is installed inside a finder window provided in a housing and displays images; an illumination unit that illuminates a space inside the finder window; and a control unit that, when the brightness of the display unit is a first brightness, sets the brightness of the illumination unit to a second brightness, and when the brightness of the display unit is a third brightness brighter than the first brightness, sets the brightness of the illumination unit to a fourth brightness brighter than the second brightness. According to the invention, the control unit makes the illumination unit bright if the display unit is bright, and lowers the brightness of the illumination unit if the display unit is dark. That is to say, since the brightness of the space is adjusted according to the brightness of the display unit such that a luminosity difference between the space inside the finder window and the display unit does not increase, it is possible to reduce or remove that a user viewing images on the display unit through the finder window feels "disorientated" as described above.

The image display device may further include a determination unit that determines whether or not the finder window is viewed, wherein the control unit may increase the brightness of the display unit and the brightness of the illumination unit as a time for the determination unit to determine that the finder window is viewed becomes longer. According to this configuration, if the finder window is continuously viewed by the user, the display unit and the illumination unit become gradually brighter with the passage of time. Thereby, the eyes of the user viewing the images on the display unit through the finder window become used to the brightness of the display unit and the brightness of the space inside the finder window, and the user hardly feels "disorientated" described above.

The image display device may further include a photographing unit that photographs an outside of the housing and generates image data, wherein the display unit may be a liquid crystal display unit having a backlight and displaying images based on the image data generated by the photographing unit, and wherein the control unit may obtain the brightness of the display unit based on any one or both of the image data and brightness of the backlight. According to the configuration, it is possible for the control unit to obtain an appropriate brightness of the display unit, and as a result, it is possible to adjust the optimal brightness of the illumination unit according to the obtained brightness of the display unit.

A user easily feels "disorientated" described above when viewing bright images in a dark space. Therefore, it is preferable that at least wall surfaces around the display unit of wall surfaces inside the housing are white. According to this configuration, since the wall surfaces around the display unit in a space which the user views through the finder window are white, darkness in the space is reduced, and, as a result, the user hardly feels "disorientated."

The technical spirit of the invention can be realized by other means as well as the image display device. For example, an invention of a method including process steps performed by the respective units of the above-described image display device (a brightness control method) or an invention of a program enabling predetermined hardware (for example, a computer embedded in the image display device) to perform the functions of the respective units of the above-described image display device (brightness control program) can be grasped as well.

BRIEF DESCRIPTION OF THE DRAWINGS

The invention will be described with reference to the accompanying drawings, wherein like numbers reference like elements.

FIG. 8 is a flowchart illustrating a process according to a second embodiment.

FIG. 9 is a flowchart illustrating a process according to a third embodiment.

FIG. 10 is a flowchart illustrating a process according to a fourth embodiment.

DESCRIPTION OF EXEMPLARY EMBODIMENTS

Hereinafter, embodiments of the invention will be described with reference to the accompanying drawings.

Figure 1:
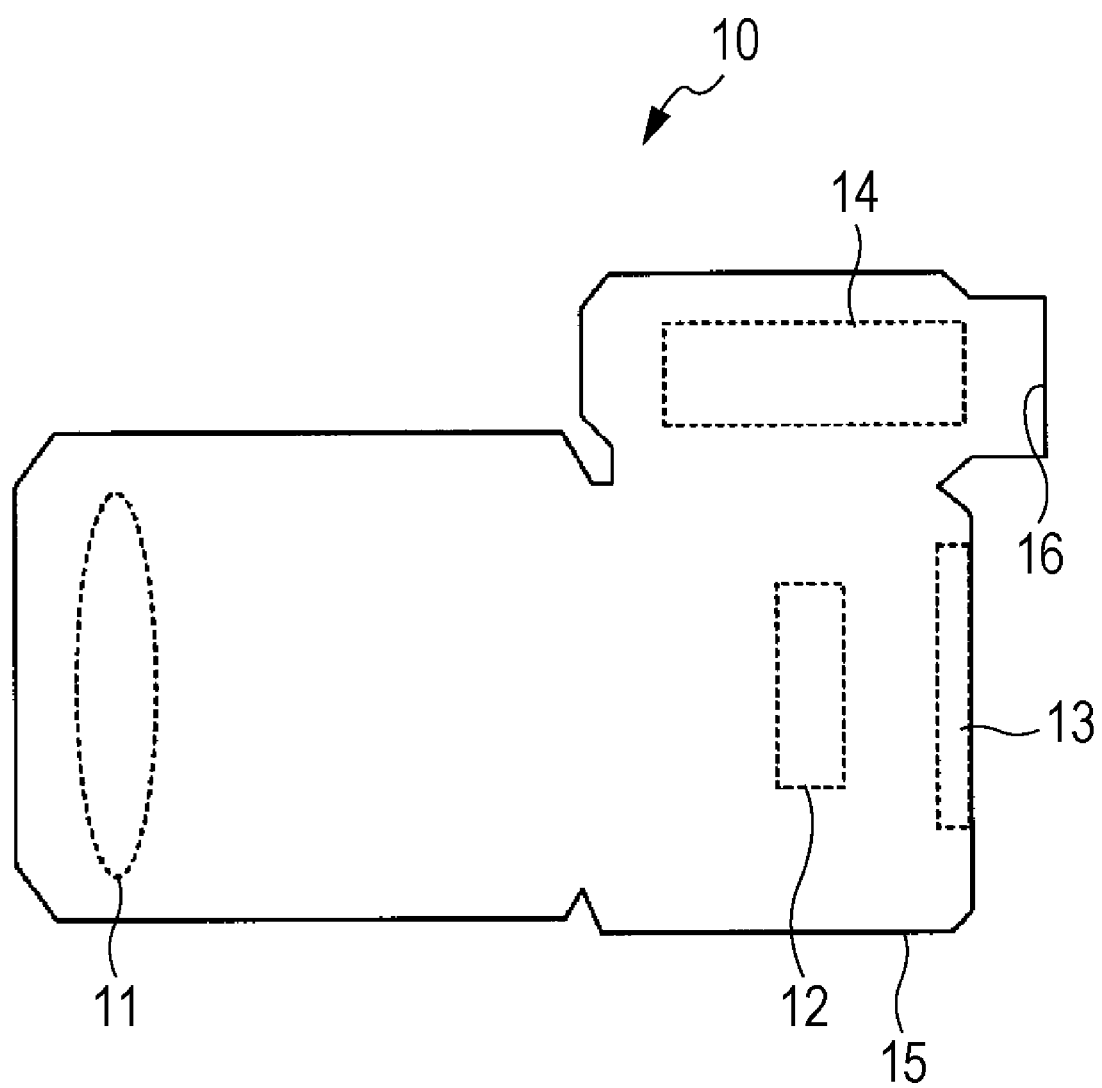
FIG. 1 is a diagram schematically illustrating a DSC when seen from the side.

FIG. 1 is a diagram schematically illustrating a DSC 10 according to this embodiment when seen from the side. In FIG. 1, portions of the internal configuration of the DSC 10 are denoted by chained lines. The DSC 10 realizes, as one of its functions, a function as an image display device according to the invention. An imaging lens 11 and an imaging element 12 are schematically installed inside the DSC 10. The imaging element 12 is an image sensor such as CCD or CMOS. A liquid crystal display for a monitor (a monitor LCD) 13 is provided in the rear surface side of the DSC 10, and an EVF 14 is provided in the rear surface side of the DSC 10 and at a predetermined position in the upper side of the monitor LCD 13. The EVF 14 is installed in a space (hereinafter, referred to as a "finder box FB") formed inside a finder window 16 which is provided in the rear surface side of a housing 15 of the DSC 10 and at a predetermined position in the upper side of the monitor LCD 13. The EVF 14 corresponds to a display unit in the invention.

Figure 2:
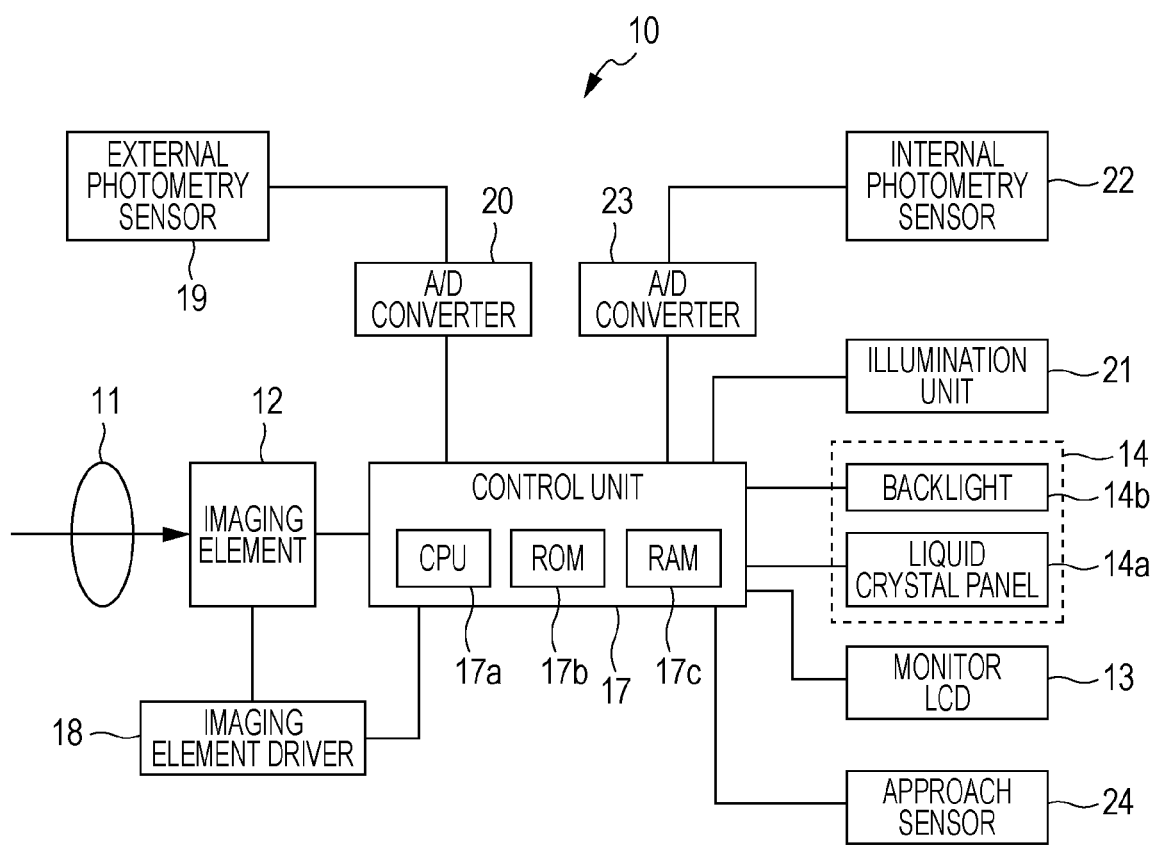
FIG. 2 is a block diagram illustrating a schematic configuration of the DSC.

FIG. 2 is a block diagram illustrating a schematic configuration of the DSC 10. In addition to the above-described constituent elements, the DSC 10 includes respective constituent elements such as a control unit 17, an imaging element driver 18, an external photometry sensor 19, an A/D converter 20, an illumination unit 21, an internal photometry sensor 22, an A/D converter 23, and an approach sensor 24. However, the DSC 10 does not necessarily include the respective constituent elements, and, for each embodiment described later, there are necessary elements and unnecessary elements.

The control unit 17 has a CPU 17a, ROM 17b, RAM 17c, and so on. The CPU 17a performs a process according to a predetermined program stored in the ROM 17b, and thereby realizes an image process in the DSC 10 or control of the entire DSC 10.

A subject image incident through the imaging lens 11 is formed on a light sensing surface of the imaging element 12. The imaging element driver 18 drives the imaging element 12 under the control of the control unit 17. The driven imaging element 12 generates an electric signal corresponding to a light amount of the subject image and A/D converts the electric signal to output digital image data. The imaging lens 11, the imaging element 12, and the imaging element driver 18 constitute an imaging unit. The control unit 17 performs a predetermined image process such as color correction for the digital image data which is then output to the EVF 14 or the monitor LCD 13.

The EVF 14 includes a liquid crystal panel 14a and a backlight 14b used as a light source of the liquid crystal panel 14a. The EVF 14 displays images on the liquid crystal panel 14a based on the digital image data output from the control unit 17. The control unit 17 can control brightness (luminance) of the backlight 14b when displaying images on the liquid crystal panel 14a. The emitting luminance of the backlight 14b can be adjusted from 0% (minimal luminance) to 100% (maximal luminance) by changing a duty ratio, for example, when the backlight 14b is intermittently driven by PWM (pulse width modulation) control. Also, a screen size of the liquid crystal panel 14a is smaller than a screen size of a liquid crystal panel (not shown) constituting the monitor LCD 13. Although not shown in the figure, there is also present a backlight corresponding to the liquid crystal panel of the monitor LCD 13.

The external photometry sensor 19 is provided at a predetermined position exposed to the outside of the housing 15 of the DSC 10, and is an obtaining unit which obtains brightness of the outside of the DSC 10. An output signal corresponding to a light amount measured by the external photometry sensor 19 is A/D converted by the A/D converter 20 and then is input to the control unit 17. The illumination unit 21 is provided inside the finder box FB and illuminates an inside of the finder box FB. The control unit 17 can adjust brightness of the illumination unit 21 by, for example, PWM control. The illumination unit 21 is constituted by, for example, LEDs.

The internal photometry sensor 22 is provided at a predetermined position exposed to the inside of the finder box FB and is an obtaining unit which obtains brightness of the inside of the finder box FB. An output signal corresponding to a light amount measured by the internal photometry sensor 22 is A/D converted by the A/D converter 23 and then is input to the control unit 17. The approach sensor 24 is provided around the finder window 16 and is a non-touch type sensor that detects the presence of a person. The approach sensor 24 can detect the approach of a person in a predetermined range very close to the finder window 16, and when detecting the approach of a person, outputs a predetermined detection signal to the control unit 17. The control unit 17 can determine whether or not the finder window 16 is viewed by a user, based on the presence or not of the detection signal.

Figure 3:
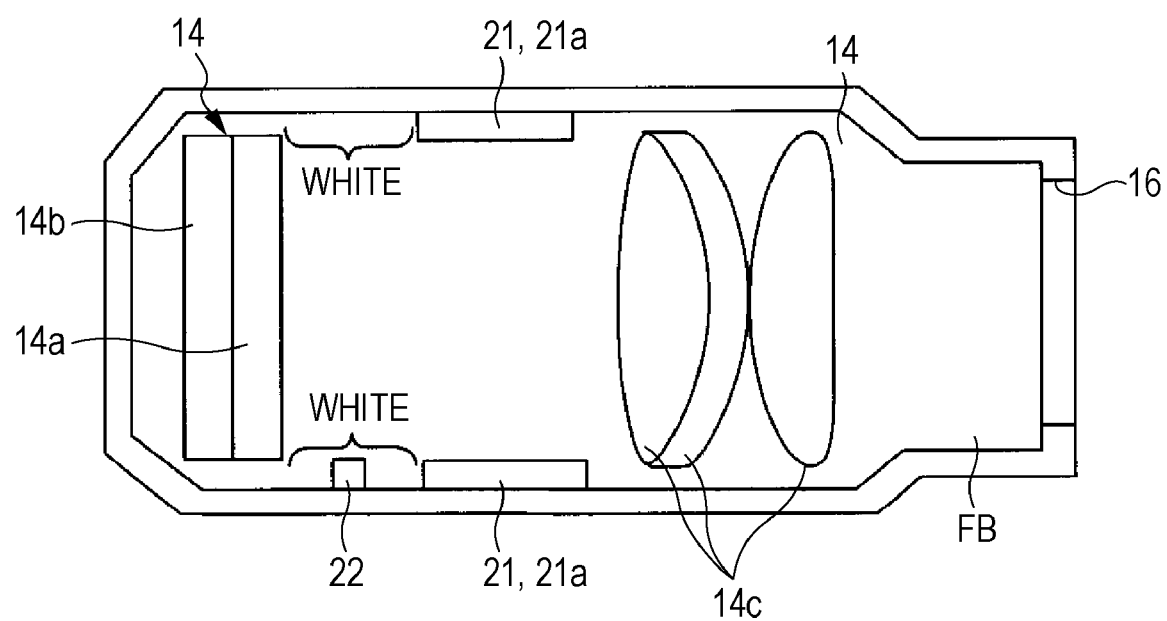
FIG. 3 is a sectional view schematically illustrating an inside of a finder box.

FIG. 3 is a sectional view schematically illustrating the inside of the finder box FB including the EVF 14 and the like. In FIG. 3, for easy viewing, hatching or the like is not shown. In the example shown in FIG. 3, the EVF 14 includes the liquid crystal panel 14a installed at a predetermined position opposite to the finder window 16 in the finder box FB, the backlight 14b provided in the rear surface of the liquid crystal panel 14a, and a predetermined number of magnifying lenses 14c provided between the liquid crystal panel 14a and the finder window 16. An LED 21a as the illumination unit 21 is provided in a wall surface in the finder box FB and in the wall surface in a predetermined range between the magnifying lenses 14c and the liquid crystal panel 14a. In addition, the internal photometry sensor 22 is provided at a predetermined position between the magnifying lenses 14c and the liquid crystal panel 14a.

A user easily feels "disorientated" when viewing a bright image in a dark space. Therefore, in this embodiment, wall surfaces around at least liquid crystal panel 14a of the wall surfaces inside the finder box FB are white. In FIG. 3, a range of the white is shown as an example. In this way, since the wall surfaces around the liquid crystal panel 14a of the wall surfaces inside the finder box FB are white, darkness around the liquid crystal panel 14a is alleviated, and, as a result, the user hardly feels "disorientated."

Hereinafter, a plurality of embodiments regarding a configuration of the DSC 10 will be described.

First Embodiment

Figure 4:
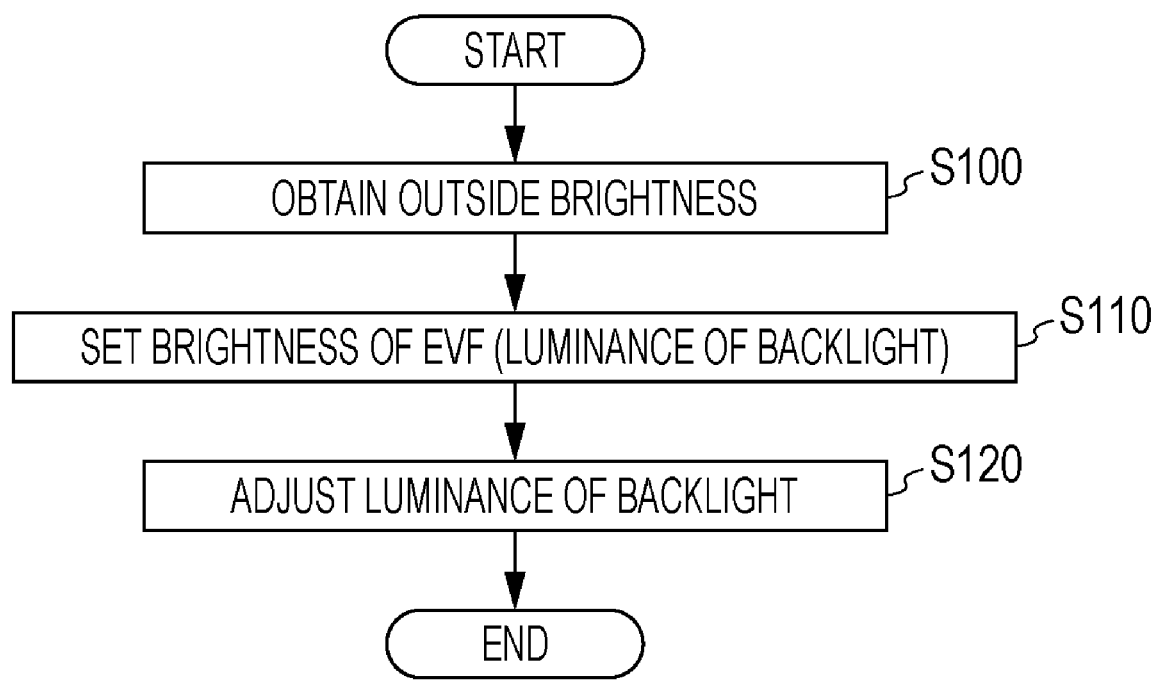
FIG. 4 is a flowchart illustrating a process according to a first embodiment.

FIG. 4 shows a brightness control process mainly performed by the control unit 17 when the EVF 14 is made to display images based on the digital image data and is a flowchart illustrating a process according to the first embodiment. First, in step S100, the control unit 17 obtains the brightness of the outside of the DSC 10 by driving the external photometry sensor 19. In other words, the control unit 17 makes the external photometry sensor 19 measure the light amount of the outside and obtains an output signal as a result of the measurement via the A/D converter 20.

In step S110, the control unit 17 sets brightness of the EVF 14 according to the brightness of the outside of the DSC 10 obtained in step S100. The brightness of the EVF 14 set here indicates a luminance of the backlight 14b. In this case, the higher the level of the light amount indicated by the measured result (that is, as the outside of the DSC 10 becomes brighter), the higher the luminance set by the control unit 17. In other words, when the level of the light amount indicated by the measured result is a first level, the control unit 17 sets a second luminance corresponding to the first level, and when the level of the light amount indicated by the measured result is a third level higher than the first level, the control unit 17 sets a fourth luminance brighter than the second luminance. The control unit 17 sets the brightness of the EVF 14 according to the measured result with reference to a table stored in a predetermined memory such as the ROM 17b in advance.

Figure 5:
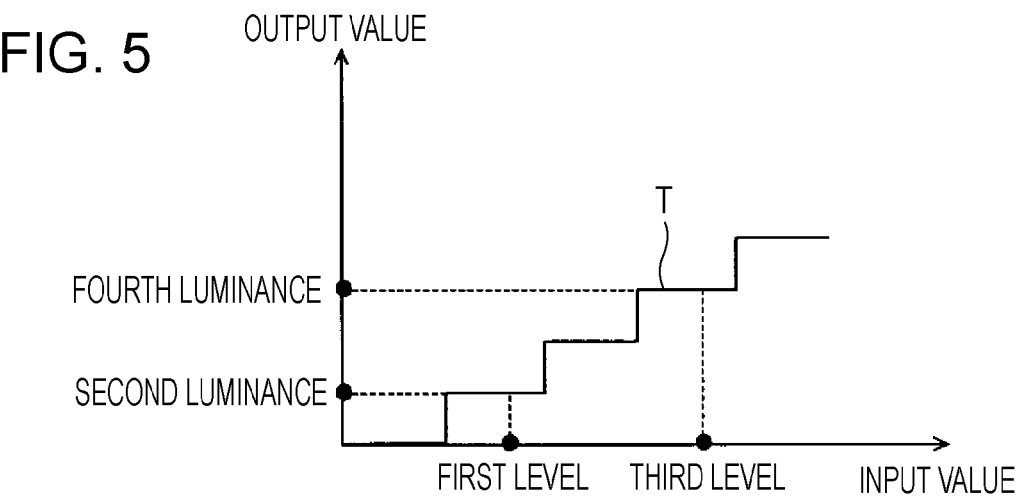
FIG. 5 is a diagram illustrating an example of a table.
Figure 6:
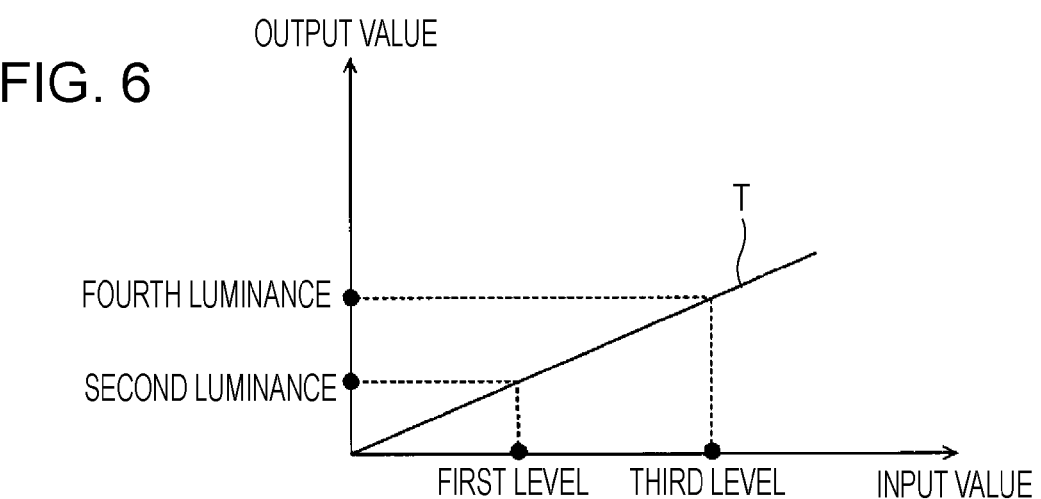
FIG. 6 is a diagram illustrating an example of a table.
Figure 7:
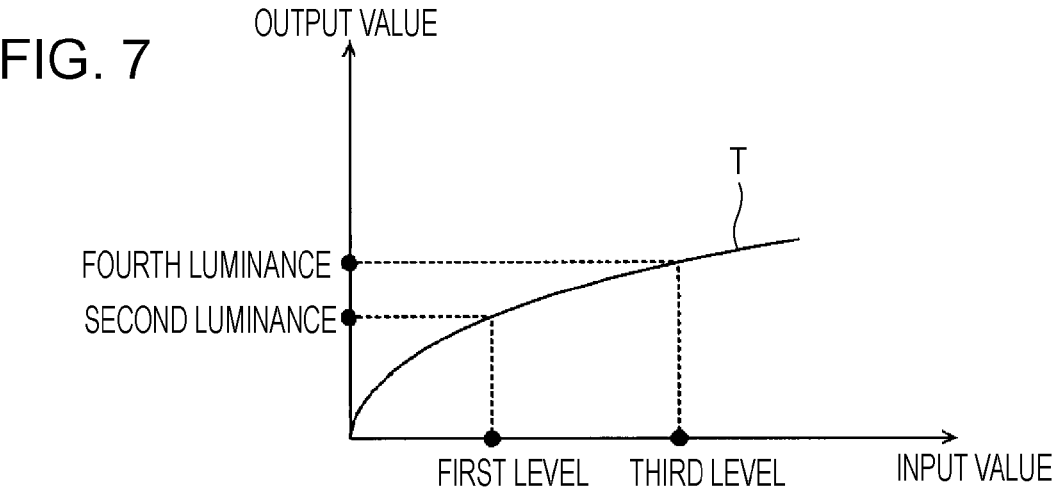
FIG. 7 is a diagram illustrating an example of a table.

FIGS. 5, 6 and 7 show examples of the table T. The tables T all define a relationship between an input value (the level of the light amount indicated by the measured result) and an output value (the luminance of the backlight 14b). The table T in FIG. 5 has a characteristic that the output value increases in a stepwise manner according to increase in the input value, and the table T in FIG. 6 has a characteristic that the output value increases linearly according to increase in the input value. The table T in FIG. 7 has a characteristic that the output value increases non-linearly according to increase in the input value. The control unit 17 sets the luminance of the backlight 14b using any one of the tables T shown in FIGS. 5 to 7.

In step S120, the control unit 17 drives the backlight 14b through PWM control in order to come to the luminance set in step S110, thereby adjusting the luminance of the backlight 14b. As a result, the backlight 14b emits light with a brightness according to the brightness of the outside of the DSC 10 (the backlight 14b emits light with a high luminance if the outside is bright, and the backlight 14b emits light with a low luminance if the outside is dark). In this way, according to the first embodiment, the brightness of the EVF 14 is also adjusted according to the brightness of ambient light of the DSC 10. For this reason, the problem in the related art that, for example, since an image reflected on the EVF is displayed with a high luminance regardless of the brightness of the actual scene even if the ambient scene around the actual user is dark, the user feels "disorientated", is solved.

Although the control unit 17 obtains the outside brightness by driving the external photometry sensor 19 in step S100, the external photometry sensor 19 is not necessarily employed. In step S100, the control unit 17 may obtain brightness of the outside of the DSC 10 based on the digital image data generated and output by the imaging element 12. That is to say, the control unit 17 analyzes the image data to, for example, calculate an average luminance for the image data, and obtains the calculated average luminance as the brightness of the outside of the DSC 10. In addition, in step S110, the control unit 17 sets a luminance of the backlight 14b corresponding to the brightness obtained in this way, using the tables having the input and output characteristics as shown in FIGS. 5 to 7. In this case, the above-described "level of the light amount indicated by the measured result" is replaced with "the average luminance for the image data."

In this way, when the configuration where brightness of the outside of the DSC 10 is obtained based on the image data obtained by the imaging element 12 is employed, there is no need for the external photometry sensor 19 for obtaining brightness of the outside of the DSC 10, and thus costs for the entire device are reduced. In the first embodiment, the illumination unit 21, the internal photometry sensor 22, and the A/D converter 23 are not used, and thus they can be omitted from the configuration of the DSC 10.

In addition, there is a case where immediately after the finder window 16 is viewed by a user, the user's eyes are not accustomed to brightness of the EVF 14 inside the finder box FB, the user feels images on the liquid crystal panel 14a are brilliant or feels discomfort (feels "disorientated"). Therefore, the control unit 17 determines whether or not the finder window 16 is viewed by a user, and brightness of the EVF 14 may be increased as the time that the finder window 16 is viewed by the user becomes longer. Specifically, for example, the control unit 17 sets the luminance of the backlight 14b in step S110 as described above, then, in step S120, does not take the set luminance as a luminance of the backlight 14b immediately, and monitors the input of a detection signal from the approach sensor 24.

When the detection signal is continuously input, that is, during the period when it is determined that the finder window 16 is viewed by the user, the luminance of the backlight 14b gradually increases with the passage of time, and finally the luminance of the backlight 14b increases to the above-described set luminance. In this configuration, the eyes of the user who views images on the liquid crystal panel 14a through the finder window 16 are appropriately used to the brightness of the liquid crystal panel 14a, and the user hardly feels "disorientated." Also, when the luminance of the backlight 14b gradually increases with the passage of time, the method of the increase may be stepwise, linear or non-linear. Also, in step S120, a luminance of the backlight 14b may be taken as the set luminance immediately, the luminance of the backlight 14b may gradually increase with the passage of time during a period when it is determined that the finder window 16 is viewed by a user based on the detection signal from the approach sensor 24, and finally the luminance of the backlight 14b may have a constant value.

Second Embodiment

FIG. 8 shows a brightness control process mainly performed by the control unit 17 when the EVF 14 is made to display images based on the digital image data and is a flowchart illustrating a process according to the second embodiment. First, in step S200, the control unit 17 obtains brightness of the inside of the finder box FB by driving the internal photometry sensor 22. In other words, the control unit 17 makes the internal photometry sensor 22 measure a light amount and obtains an output signal as a result of the measurement via the A/D converter 23.

In step S210, the control unit 17 sets brightness of the EVF 14 according to the brightness of the inside of the finder box FB obtained in step S200. The brightness of the EVF 14 set here indicates a luminance of the backlight 14b. In this case, the control unit 17 sets a high luminance to the extent that the level of the light amount indicated by the result measured in step S200 is high (that is, as the inside of the finder box FB becomes brighter). In other words, when the level of the light amount indicated by the measured result is a first level, the control unit 17 sets a second luminance corresponding to the first level, and when the level of the light amount indicated by the measured result is a third level higher than the first level, the control unit 17 sets a fourth luminance brighter than the second luminance. In the second embodiment as well, the control unit 17 sets the brightness of the EVF 14 according to the measured result with reference to the tables T (FIGS. 5 to 7) stored in a predetermined memory such as the ROM 17b in advance.

In step S220, the control unit 17 drives the backlight 14b through PWM control in order to come to the luminance set in step S210, thereby adjusting the luminance of the backlight 14b. As a result, the backlight 14b emits light with brightness according to the brightness of the inside of the finder box FB (the backlight 14b emits light with a high luminance if the inside of the finder box FB is bright, and the backlight 14b emits light with a low luminance if the inside of the finder box FB is dark). In this way, according to the second embodiment, the luminance of the backlight 14b is adjusted according to the brightness of the inside of the finder box FB, in such a way that a brightness difference between the brightness of the inside of the finder box FB and the liquid crystal panel 14a as the EVF 14 does not increase. For this reason, it is possible to reduce or remove that a user feels "disorientated" due to the luminosity difference. In the second embodiment, the external photometry sensor 19, the A/D converter 20, and the illumination unit 21 are not used, and thus they can be omitted as the configuration of the DSC 10.

Third Embodiment

FIG. 9 shows a brightness control process mainly performed by the control unit 17 when the EVF 14 is made to display images based on the digital image data and is a flowchart illustrating a process according to the third embodiment. First, in step S300, the control unit 17 obtains the brightness of the EVF 14. In this case, the control unit 17 can obtain the brightness of the EVF 14 based on any one or both of the digital image data generated and output by the imaging element 12 and the brightness of the backlight 14b. For example, an average luminance for the digital image data is calculated and the calculated average luminance is designated as brightness of the EVF 14. Alternatively, a luminance indicated by a parameter set as indicating a luminance of the backlight 14b by the control unit 17 is designated as brightness of the EVF 14.

However, here, the control unit 17 obtains the brightness of the EVF 14 based both the digital image data and the brightness of the backlight 14b. Specifically, regarding the average luminance for the digital image data and the luminance indicated by the parameter set by the control unit 17, a predetermined coefficient for normalizing them is applied, and a result of summing or multiplying them is obtained as the brightness of the EVF 14 itself.

In step S310, the control unit 17 sets the brightness (luminance) of the illumination unit 21 (LED 21a) according to the brightness of the EVF 14 obtained in step S300. In this case, the control unit 17 sets a high luminance to the extent that the brightness of the EVF 14 obtained in step S300 is high. In other words, when the brightness of the EVF 14 has a first level, the control unit 17 sets a second luminance corresponding to the first level, and when the brightness of the EVF 14 has a third level higher than the first level, the control unit 17 sets a fourth luminance brighter than the second luminance. In the third embodiment as well, the control unit 17 sets the luminance of the LED 21a according to the brightness of the EVF 14 with reference to the tables T (FIGS. 5 to 7) stored in a predetermined memory such as the ROM 17b in advance. In this case, the above-described "level of the light amount indicated by the measured result" is replaced with "the brightness of the EVF 14 obtained in step S300."

In step S320, the control unit 17 drives the LED 21a through PWM control in order to come to the luminance set in step S310, thereby adjusting the luminance of the LED 21a. As a result, the LED 21a emits light with brightness according to the brightness of the EVF 14 itself (the LED 21a emits light with a high luminance if the EVF 14 is bright, and the LED 21a emits light with a low luminance if the EVF 14 is dark). That is to say, the brightness of the inside of the finder box FB is adjusted according to the brightness of the EVF 14 itself, such that a brightness difference between the brightness of the EVF 14 itself and the brightness of the inside of the finder box FB does not increase. Therefore, it is possible to reduce or eliminate the problem that a user feels "disorientated" due to the luminosity difference. In the third embodiment, the external photometry sensor 19, the A/D converter 20, the internal photometry sensor 22, and the A/D converter 23 are not used, and thus they can be omitted as the configuration of the DSC 10.

In the third embodiment, the control unit 17 determines whether or not the finder window 16 is viewed by a user, and brightness of the EVF 14 and brightness of the illumination unit 21 may be increased as a time for the finder window 16 to be viewed by the user becomes longer. Specifically, the control unit 17 sets a luminance of the LED 21a in step S310 as described above, then, in step S320, does not take the set luminance as a luminance of the LED 21a immediately, and monitors the input of a detection signal from the approach sensor 24. When the detection signal is continuously input, that is, during the period when it is determined that the finder window 16 is viewed by the user, the luminance of the LED 21a and the luminance of the backlight 14b respectively gradually increase with the passage of time, and finally the luminance of the LED 21a increases to the luminance set in step S310, and the luminance of the backlight 14b increases to a luminance indicated by the parameter set by the control unit 17. In this configuration, the eyes of the user who views images on the liquid crystal panel 14a through the finder window 16 are appropriately used to the brightness of the inside of the finder box FB and the brightness of the liquid crystal panel 14a, and the user hardly feels "disorientated." Also, when the luminance of the LED 21a and the luminance of the backlight 14b gradually increase with the passage of time, the method of the increase may be stepwise, linear or non-linear. Also, in step S320, a luminance of the LED 21a may be taken as the set luminance immediately, the luminance of the LED 21a and the luminance of the backlight 14b may gradually increase with the passage of time during a period when it is determined that the finder window 16 is viewed by a user based on the detection signal from the approach sensor 24, and finally the luminance of the LED 21a and the backlight 14b may have a constant value.

Fourth Embodiment

FIG. 10 shows a brightness control process mainly performed by the control unit 17 when the EVF 14 is made to display images based on the digital image data and is a flowchart illustrating a process according to the fourth embodiment. First, in step S400, the control unit 17 obtains brightness of the outside of the DSC 10 by driving the external photometry sensor 19. In other words, the control unit 17 makes the external photometry sensor 19 measure the outside light amount and obtains an output signal as a result of the measurement via the A/D converter 20.

In step S410, the control unit 17 sets brightness (luminance) of the illumination unit 21 (LED 21a) according to the brightness of the outside of the DSC 10 obtained in step S400. In this case, the control unit 17 sets a high luminance to the extent that the level of the light amount indicated by the measured result in step S400 is high (that is, as the outside of the DSC 10 becomes brighter). In other words, when the level of the light amount indicated by the measured result is a first level, the control unit 17 sets a second luminance corresponding to the first level, and when the level of the light amount indicated by the measured result is a third level higher than the first level, the control unit 17 sets a fourth luminance brighter than the second luminance. In the fourth embodiment as well, the control unit 17 sets the luminance of the LED 21a according to the brightness of the outside of the DSC 10 with reference to the tables T (FIGS. 5 to 7) stored in a predetermined memory such as the ROM 17b in advance.

In step S400, the control unit 17 does not obtain the outside brightness using the external photometry sensor 19 but may obtain the brightness of the outside of the DSC 10 based on the digital image data generated and output by the imaging element 12. That is to say, the control unit 17 analyzes the image data to, for example, calculate an average luminance for the image data, and obtains the calculated average luminance as the brightness of the outside of the DSC 10. In addition, in step S410, the control unit 17 sets a luminance of the LED 21a corresponding to the brightness obtained based on the image data in this way, using the tables having the input and output characteristics as shown in FIGS. 5 to 7. In this case, the above-described "level of the light amount indicated by the measured result" is replaced with "the average luminance for the image data."

In step S420, the control unit 17 drives the LED 21a through PWM control in order to come to the luminance set in step S410, thereby adjusting the luminance of the LED 21a. As a result, the LED 21a emits light with brightness according to the brightness of the outside of the DSC 10 (the LED 21a emits light with a high luminance if the outside is bright, and the LED 21a emits light with a low luminance if the outside is dark). In this way, according to the fourth embodiment, the brightness of the illumination unit 21 (the brightness of the inside of the finder box FB) is adjusted according to the brightness of ambient light of the DSC 10. Thereby, the problem in the related art that a user viewing the EVF 14 feels "disorientated" due to a difference between the brightness of the outside and the brightness of the inside of the finder box FB, is solved. In the fourth embodiment, the internal photometry sensor 22 and the A/D converter 23 are not used, and thus they can be omitted from the configuration of the DSC 10.

In the fourth embodiment, the control unit 17 determines whether or not the finder window 16 is viewed by a user, and brightness of the EVF 14 and brightness of the illumination unit 21 may be increased as the time for the finder window 16 to be viewed by the user becomes longer. Specifically, the control unit 17 sets a luminance of the LED 21a in step S410 as described above, then, in step S420, does not take the set luminance as a luminance of the LED 21a immediately, and monitors input of a detection signal from the approach sensor 24. When the detection signal is continuously input, that is, during the period when it is determined that the finder window 16 is viewed by the user, the luminance of the LED 21a and the luminance of the backlight 14b respectively gradually increase with the passage of time, and finally the luminance of the LED 21a increases to the set luminance set in step S410, and the luminance of the backlight 14b increases to a luminance indicated by the parameter set by the control unit 17. In this configuration, the eyes of the user who views images on the liquid crystal panel 14a through the finder window 16 are appropriately used to the brightness of the inside of the finder box FB and the brightness of the liquid crystal panel 14a, and the user hardly feels "disorientated." Also, when the luminance of the LED 21a and the luminance of the backlight 14b gradually increase with the passage of time, the method of the increase may be stepwise, linear or non-linear. Also, in step S420, a luminance of the LED 21a may be taken as the set luminance immediately, the luminance of the LED 21a and the luminance of the backlight 14b may gradually increase with the passage of time during a period when it is determined that the finder window 16 is viewed by a user based on the detection signal from the approach sensor 24, and finally the luminance of the LED 21a and the backlight 14b may have a constant value.

Others

The present invention is not limited to the above-described embodiments but may have a variety of modifications without departing from the scope thereof. Of course, configurations combining the above-described respective embodiments may be implemented.

As an effect common to the respective embodiments, there is a power saving effect in regard to the entire DSC 10 according to positive use of the EVF 14 by a user. That is to say, according to the respective embodiments, since the disorientation of a user using the EVF 14 is reduced or eliminated, it is thought that the user positively uses the EVF 14 instead of the monitor LCD 13. As described above, since in the EVF 14, the screen size of the liquid crystal panel 14a is smaller than the screen size of the monitor LCD 13, if the EVF 14 is used more than the monitor LCD 13, power consumption in the DSC 10 is reduced and thus the photographing is possible for a longer time using the DSC 10.

The configuration of the invention can be applied to various kinds of devices in addition to the camera equipped with the EVF. For example, the invention can be applied to a wearable display using an LCD in order to adjust the brightness of the LCD or the brightness of the inside of a space surrounding the LCD.

The entire disclosure of Japanese Patent Application No. 2010-030290, filed Feb. 15, 2010 is incorporated by reference herein.

What is claimed is:

1. An image display device comprising:
a display unit that is installed inside a finder window provided in a housing and displays images;
an illumination unit that illuminates a space inside the finder window, between the finder window and the display unit; and
a control unit that, when brightness of the display unit is a first brightness, sets the brightness of the illumination unit to a second brightness, and when the brightness of the display unit is a third brightness brighter than the first brightness, sets the brightness of the illumination unit to a fourth brightness brighter than the second brightness.

2. The image display device according to claim 1, further comprising a determination unit that determines whether or not the finder window is viewed,
wherein the control unit increases the brightness of the display unit and the brightness of the illumination unit as a time for the determination unit to determine that the finder window is viewed becomes longer.

3. The image display device according to claim 1, further comprising a photographing unit that photographs an outside of the housing and generates image data, wherein the display unit is a liquid crystal display unit having a backlight and displaying images based on the image data generated by the photographing unit, and wherein the control unit obtains brightness of the display unit based on any one or both of the image data and brightness of the backlight.

4. The image display device according to claim 1, wherein at least wall surfaces around the display unit of wall surfaces inside the housing are white.

5. A brightness control method comprising:
displaying images on a display unit that is installed inside a finder window provided in a housing;
causing an illumination unit provided in a space inside the finder window to illuminate the space between the finder window and the display unit; and
when brightness of the display unit is a first brightness, setting the brightness of the illumination unit to a second brightness, and when the brightness of the display unit is a third brightness brighter than the first brightness, setting the brightness of the illumination unit to a fourth brightness brighter than the second brightness.

6. A non-transitory computer readable medium containing a brightness control program executable by a processor enabling a computer to perform a method comprising:
displaying images on a display unit that is installed inside a finder window provided in a housing;
causing an illumination unit provided in a space inside the finder window to illuminate the space between the finder window and the display unit; and
when brightness of the display unit is a first brightness, setting the brightness of the illumination unit to a second brightness, and when the brightness of the display unit is a third brightness brighter than the first brightness, setting the brightness of the illumination unit to a fourth brightness brighter than the second brightness.

* * * * *